United States Patent Office 3,645,994
Patented Feb. 29, 1972

3,645,994
PROCESS FOR HYDROGENATION OF
AROMATIC HYDROCARBONS
Lloyd M. Watson and William R. Birchall, Cincinnati,
Ohio, assignors to National Distillers and Chemical
Corporation, New York, N.Y.
No Drawing. Original application Aug. 18, 1967, Ser. No.
661,538. Divided and this application May 21, 1970,
Ser. No. 48,597
Int. Cl. C08d *3/04, 3/06;* C08f *7/02*
U.S. Cl. 260—82.1                                5 Claims

ABSTRACT OF THE DISCLOSURE

A process is provided for the hydrogenation of aromatic hydrocarbons having a naphthalene nucleus, using metallic sodium and a lower aliphatic alcohol as the source of hydrogen, employing sodium with an average particle size within the range from about 0.5 to about 50 microns, dispersed in an inert diluent.

A process is also provided for the preparation of alfin polymers by polymerization of an unsaturated organic compound in the presence of an alfin catalyst, employing as the molecular weight modifier the crude dihydronaphthalene dissolved in an inert diluent that is obtained in this by hydrogenation.

---

This application is a division of copending application Ser. No. 661,538, filed Aug. 18, 1967, and assigned to the assignee of the present invention.

This invention relates to a process for the hydrogenation of naphthalene and naphthalene derivatives, and more particularly, to the hydrogenation of such aromatic compounds containing a naphthalene nucleus by carrying out the hydrogenation using a dispersion of finely-divided sodium, with an aliphatic alcohol as the source of hydrogen. Any naphthalene derivative stable under these reaction conditions can be hydrogenated by this process. In addition, a process for preparing alfin polymers is provided employing the above hydrogenated aromatic compounds as molecular weight moderators.

Morton and coworkers in a series of papers in the Journal of the American Chemical Society, starting in 1947, describe an organo alkali metal catalyst for the polymerization of olefins and particularly dienes, which they termed an alfin catalyst, Journal of the American Chemical Society, 69, 161, 167, 950, 1675, 2224 (1947). The name "alfin" was taken from the use of an alcohol and an olefin in their preparation. The alcohol, a methyl n-alkyl carbinol in the form of the sdoium salt, an alkali metal halide and the olefin, also in the form of the sodium salt, form a complex that constitutes the catalyst.

These catalysts were reported by Morton et al. to cause the polymerization of butadiene, isoprene, and other dienes, alone and together with other copolymerizable organic compounds, in most cases diolefinic in nature. The catalyst was discovered in the course of a study of the addition of organo sodium compounds to dienes. Later on, Morton summarized the work done up until 1950 in Industrial and Engineering Chemistry, 42 1488–1496 (1950).

The polymers obtained using alfin catalysts are termed alfin polymers of alfin rubbers. Because of the speed and ease of the polymerization reaction, these attracted considerable interest in the 1940's and early 1950's. However, the very speed of the reaction led to problems. The alfin rubbers as initially prepared have the disadvantage of having an extremely high molecular weight, having dilute solution viscosities in toluene of 10 to 15. As a result, although the polymers are generally gel-free and have high tensile strength, superior abrasion resistance, and tear strength, they are also very tough, and exhibit little breakdown and poor banding on the mill. Therefore, they are difficult if not impossible to process using conventional equipment.

Greenberg et al. U.S. Pats. Nos. 3,067,187, granted Dec. 4, 1962, and 3,223,691, granted Dec. 14, 1965, showed how the molecular weight of the alfin rubbers or polymers could be controlled within a prescribed range of from about 50,000 to about 1,250,000, so that they could be processed using conventional equipment. Greenberg et al. controlled the molecular weight of the polymer by incorporation of a molecular weight moderator, a dihydroaromatic compound, such as dihydrobenzene or dihydronaphthalene, during the polymerization reaction. As a consequence, the interest in the alfin rubbers has been renewed, and they are now finding commercial application. In view of this, there has been a considerable interest in the preparation of dihydroaromatic compounds for use in this polymerization reaction.

1,4-dihydronaphthalene and 1,4-dihydrobenzene are preferred as molecular weight moderators in the process for preparing alfin rubbers.

It has long been known to prepare 1,4-dihydronaphthalene by reducing naphthalene with solid or bulk sodium, such as stick sodium, and alcohol. The naphthalene is dissolved in a solvent and the solid or bulk sodium is mixed therewith. An alcohol is added to the mixture to react with sodium to form a corresponding sodium alkoxide, and hydrogen is thereby released. The hydrogen reduces the naphthalene to 1,2- and 1,4-dihydronaphthalene.

It has been found that this procedure for preparing 1,4-dihydronaphthalene is rather inefficient due to the formation of agglomerates or balls of sodium in the reaction mixture which are dangerous to handle. Furthermore, the solid or bulk sodium does not readily react with the aliphatic alcohol under the conditions of the reaction, and may form an undesirable sodium residue in the completed reaction product. Any such residual sodium can cause considerable difficulty in pumping and metering the hydrogenated product. Furthermore, if the dihydronaphthalene product contains residual sodium it cannot be employed directly, without purification, as a molecular weight moderator with the alfin catalysts in alfin polymerizations because the presence of free sodium in the polymerization reaction mixture will cause another type of polymerization.

In accordance with the instant invention, a process is provided for preparing dihydronaphthalenes by partial reduction of the corresponding naphthalene or naphthalene derivative with a dispersion of sodium using an aliphatic alcohol as the source of hydrogen. In the process of this invention, a finely-divided sodium dispersion is employed. An effective reduction is obtained when the sodium has a maximum average particle size within the range from about 0.5 to about 50 microns. The preferred size is an average size of less than 10 microns.

The use of finely-divided sodium ensures that the sodium can be substantially uniformly distributed in the reaction mixture. If sodium particles larger than 50 microns are employed, the sodium may tend to agglomerate or form balls of sodium in the reaction mixture which are very undesirable as indicated hereinbefore.

The use of sodium in small particle form as defined above gives excellent control of the dispersion of sodium in the reaction mixture, and facilitates the addition of alcohol thereto without danger of an explosion, due to rapid liberation of heat, which may occur should large pieces of sodium be present.

Following reaction, water is added to the reaction dispersion. This converts the sodium alkoxide to NaOH and the alcohol. These are removed by successive water washes and finally by azeotropic distillation to remove substantially all of the water.

After removal of water and any excess alcohol, the aromatic dihydronaphthalene-containing reaction mixture formed by the process of the instant invention can be employed directly as a molecular weight moderator or control agent with alfin catalysts in the alfin rubber process without the need for separating, purifying, concentrating or removing the aromatic dihydronaphthalene from the solvent or inert diluent for the sodium, except for a water wash to remove any residual alcohol and alkali, followed by drying, if necessary. It is therefore preferred to employ a solvent or inert diluent for the sodium in forming the sodium dispersion which solvent is suitable for use as a solvent for the alfin catalyst in the alfin rubber process. In this case, it is desirable that the alcohol employed as the source of hydrogen in the above process also be suitable for use in the alfin rubber process. Isopropanol is preferred since it is also used in preparing alfin catalyst. If the solvent or inert diluent for the sodium and/or alcohol cannot be employed in the alfin rubber process, these materials including any water can be removed from the aromatic dihydronaphthalene by conventional means, such as by distillation.

Thus, in addition, in accordance with the instant invention, an improvement in the manufacture of alfin rubbers or polymers is provided, which comprises polymerizing an unsaturated organic compound in the presence of an alfin catalyst and the impure aromatic dihydronaphthalene prepared by reduction of the corresponding naphthalene or naphthalene derivative with a dispersion of sodium using an aliphatic alcohol as the source of hydrogen, after removal of sodium alkoxide, water and excess alcohol.

In order that the solvent-containing aromatic dihydronaphthalene may be employed without further purification in the alfin rubber process, the concentration of the dihydronaphthalene should be within a range from about 1 to about 20% by weight and preferably in an amount within a range from about 1 to about 10% by weight. Concentration can be adjusted by removal or addition of solvent.

The process of the invention is applicable to any aromatic hydrocarbon having a naphthalene nucleus including, in addition to naphthalene, α-methyl naphthalene, β-methyl naphthalene, 1,10-dimethyl naphthalene, α-ethyl naphthalene, and β-ethyl naphthalene. Any substituent on the naphthalene nucleus should be stable during the reduction reaction.

Any lower aliphatic alcohol can be employed as a source of hydrogen in the process of the invention. Sodium reacts with the hydroxyl group of the alcohol, forming the sodium alkoxide, and hydrogen is liberated as the reactant. Exemplary aliphatic monohydric alcohols include methanol, ethanol, propanol, isopropanol, butanol, tertiary butanol, sec-butanol, isobutanol, pentanol, isopentanol, secondary pentanol, hexanol and isohexanol. Isopropanol for use in the alfin rubber process, and methanol both give excellent results, and are readily available, and therefore are usually preferred.

It is usually advantageous to use as the aliphatic alcohol the same alcohol, i.e., a secondary or methyl n-alkyl carbinol, that is employed in the preparation of the alfin catalyst used in the alfin polymerization with the dihydronaphthalene produced as the reaction product of the process, this usually being isopropanol. In this event, the crude dihydronaphthalene can be used directly in an alfin rubber process, after removal of the sodium alkoxide. Isopropanol can be employed as the source of hydrogen for reduction of naphthalene if a dispersion of sodium is employed therewith. If a sodium dispersion is not employed, and instead, bulk sodium is used, isopropanol is not an efficient source of hydrogen. Thus, for example, if stick sodium is employed, a practical hydrogen source would be ethanol. However, if ethanol is employed as the hydrogen source, the dihydronaphthalene product would not be useful as is, without substantial purification, in the alfin rubber process.

The dispersion of sodium which is admixed with the naphthalene-solvent mixture should contain an amount of sodium sufficient to release an amount of hydrogen within the range from about 5 to 10% in excess of that stoichiometrically required to reduce substantially all of the naphthalene to 1,4-dihydronaphthalene. An excess of alcohol of from about 5 to about 10% above the amount required to produce such hydrogen is used, to prevent free sodium from being present at the conclusion of the reduction.

The dispersion of sodium can be prepared by following conventional techniques, such as disclosed in U.S. Pat. No. 3,012,974, to Robinson et al., dated Dec. 12, 1961. The concentration of sodium in the dispersion is not critical, and can be adjusted to suit any reduction reaction, so long as enough sodium is present to supply the 5 to 10% excess of hydrogen stoichiometrically required to react with the naphthalene.

The sodium is put in finely-divided form by high shear agitation or homogenizing in the presence of an inert diluent and dispersing aid. Any conventional mixing or homogenizing equipment can be employed. Because of the dangers in handling sodium, it is necessary that the equipment be fitted with means for carrying out the operation under an inert atmosphere, such as nitrogen, argon or helium. A particularly effective sodium dispersion can be prepared using a Manton Gaulin mill, which is capable of reducing sodium to an average particle size of from about 1 to 2 microns in a reasonable time cycle.

The amount of sodium in the dispersion is not critical, and can be adjusted to suit any alfin catalyst preparatory procedure that is desired. Usually, a sodium concentration within the range from about 25 to about 50% is satisfactory.

The inert diluent that is employed for dispersion of the sodium can be any liquid aliphatic or cycloaliphatic saturated hydrocarbon, especially those suitable for the alfin rubber process. The hydrocarbon should be a liquid under the conditions during which the sodium dispersion and the alfin catalyst are formed. This requires that it remain liquid at temperatures as low as −20° C. and below, the lowest temperature reached during alfin catalyst preparation, and at temperatures as high as 130° C., the maximum temperature normally reached during sodium dispersion formation. Suitable solvents include hydrocarbons, such as heptane, octane, isooctane, nonane, decane, mineral spirits, odorless mineral spirits, mineral oil, as well as commercially available solvent mixtures including any of these hydrocarbons as well as alkylates, which comprise branched paraffin hydrocarbons with high octane number, generally blended with other hydrocarbon mixtures, for example, Isopar E, a specific analysis of which is hereinafter set out in Examples 2 and 3, Sinclair Light Alkylate, having the typical composition:

| Component: | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other $C_8$ and $C_9$ branched aliphatic hydrocarbons | 46.6 |
| | 100.0 | and Isopar C, which is a mixture of isoparaffins containing 70 to 80% 2,2,4-trimethyl pentane and homologues thereof, and any of the above-mentioned branched chain aliphatic hydrocarbons. Also useful are cycloaliphatic hydrocarbons, such as cyclohexane, cyclopentane, methyl cycloheptane and cycloheptane. Odorless mineral spirits, boiling range 349–406° F., and the Isopars are preferred.

It is usually preferable to run the diluent into the mixing apparatus, such as the Gaulin mill. Sodium metal is then added together with a suitable dispersing aid, such as aluminum distearate. The system must be placed under an inert gas, such as nitrogen, argon or helium, during the dispersion. The diluent is brought to a temperature at which the metallic sodium liquefies, and milling is then begun, to reduce the molten sodium to a small particle size. The finished dispersion is then stored under nitrogen or other inert gas to preserve its activity. When prepared properly, the dispersion is stable for two weeks or more.

It will, of course, be apparent that any mixing or homogenizing equipment can be used in dispersion of the sodium in the inert diluent. It is generally preferred that the equipment be capable of dispersing the sodium in the diluent to an average particle size within the range from about 0.5 to about 50 microns. The temperature employed during the dispersion must to above the melting point of sodium, and, because sodium melts at 97.6° C., temperatures within the range of from about 100 to 120° C. are suitable. It is preferred to work at a temperature above 110° C. Excessively high temperatures are not desirable, because of the danger involved in handling sodium at high temperatures in the presence of hydrocarbon solvents.

The inert diluent employed in the preparation of such sodium dispersions is completely miscible with the reaction system employed in the present invention.

In forming the dihydronaphthalene, the naphthalene is initially dissolved in any suitable solvent in which naphthalene and the alcohol are soluble, and which is chemically inert to the reactants and the products and preferably one which is used in the dispersion preparation and alfin polymerization. Typical solvents include branched and straight chain aliphatic hydrocarbon solvents. The branched chain aliphatic hydrocarbons which are suitable for use in the present invention are those having from about 4 to about 15 carbon atoms. Examples of suitable hydrocarbons include:

2-methylpropane,
2-methylbutane,
2,3-dimethylbutane,
2-methylpentane,
3-methylpentane,
2,2-dimethylpentane,
2,3-dimethylpentane,
2,4-dimethylpentane,
2,2,4-trimethylpentane,
2-methylhexane,
3-methylhexane,
2,4-dimethylhexane,
2,5-dimethylhexane,
2,2,4-trimethylhexane,
2,3,4-trimethylhexane,
3,3,4-trimethylhexane,
2-methylheptane,
3-methylheptane,
2,3-dimethylheptane,
3,4-dimethylpentane,
2-methyloctane,
2,3-dimethyloctane,
2-methylnonane,
3,4-dimethylnonane,
3-methyldecane,
2-methylundecane,
2-methyldodecane,
2,2,4-trimethyldodecane, etc., and mixtures thereof. While the examples have been listed with respect to the mono, di, and trimethyl substituted aliphatic hydrocarbons, it should be appreciated that other lower alkyl substituted hydrocarbons are considered applicable. Other suitable alkyl radicals include ethyl, isopropyl, butyl, etc. Especially suitable, since they are readily obtainable, are commercial mixtures of branched aliphatic hydrocarbons, such as odorless mineral spirits, Isopar C, Isopar E, Sinclair's Light Alkylate, and hexane.

Cycloaliphatic hydrocarbons that can be used include cyclohexane, cyclopentane, cycloheptane, cyclooctane and methyl cyclohexane. Straight chain aliphatic hydrocarbons that can be used include n-pentane, n-hexane, n-heptane, n-octane, n-decane, n-nonane and n-undecane.

The alcohol should be added very slwoly to the naphthalene-sodium-solvent system, with good agitation to ensure that the sodium alkoxide formed will be well dispersed in the reaction mixture. During the reaction of the alcohol with the sodium and the subsequent reduction of the naphthalene to 1,4-dihydronaphthalene, the temperature of the reaction mixture should be maintained within the range from about 75 to about 200° F. or higher, and preferably from about 110 to about 175° F. The maximum reaction temperature is the decomposition temperature of the products or reactants.

The reaction of the napthalene, sodium and alcohol should be allowed to proceed until substantially all of the naphthalene has been reduced to 1,4-dihydronaphthalene. This can require a reaction time of from about 1 to about 30 hours, depending upon the reactants and the amounts employed and the reaction conditions. Normally, a reaction time of from about 3 to about 20 hours is employed.

Upon completion of the reaction, additional alcohol can be added so as to eliminate any excess residual sodium. Water is added to the reaction mixture to hydrolyze the sodium alkoxide, forming sodium hydroxide and regenerating the alcohol. It is important to separate the alkaline aqueous layer from the organic layer which contains the dihydronaphthalene as rapidly as possible, in order to avoid possible isomerization of 1,4-dihydro isomer, the desired product, to 1,2-dihydro isomer.

In the water quench step or initial water wash, water is added slowly to the reaction mixture to decompose the alkoxide to sodium hydroxide and the alcohol. When this decomposition is complete, a large volume of additional water is added and the mixture is agitated from, for example, 5 to 15 minutes. This mixture is allowed to settle, resulting in the formation of an aqueous layer containing the bulk of the sodium hydroxide, and this layer is then separated. A weight ratio of water to solvent for the naphthalene present in the reaction product of within the range from about 0.6:1 to about 1.25:1, and preferably from about 0.7:1 to about 1.0:1, is desired to ensure complete reduction of the alkoxide to the alcohol and sodium hydroxide and to dilute the sodium hydroxide formed.

The subsequent water washes after the removal of the initial aqueous layer containing the bulk of the sodium hydroxide are important in ensuring the removal of the bulk of the alcohol and residual sodium hydroxide, and thereby reduce the possibility of the formation of large amounts of the 1,2-dihydronapthalene. The water-to-naphthalene solvent ratio employed in the subsequent water washes should be within the range from about 0.4:1 to about 1.6:1, and preferably from about 1.5:1 to about 1.6:1. Employing ratios of water to solvent below the above range results, in many cases, in an incomplete removal of sodium hydroxide and alcohol, while the use of water to solvent ratios higher than those set out in the above range affords no significant benefits, and results in increased volumes of water in the reaction product, which must be removed therefrom.

After the quench and washing steps, the product can be concentrated by removing water and alcohol by distilling from about ½ to about ¾ of the initial solvent charge. Final drying can be accomplished by passing the dihydronaphthalene-solvent solution through a suitable molecular sieve.

The process of the instant invention for preparing dihydronaphthalene can be carried out employing conventional equipment including a closed agitated vessel, jacketed for water cooling, and provided with an inert gas purge, such as nitrogen, suitable reactant charging ports or inlets, preferably at the top of the vessel, and a discharge port or oulet at the bottom of the vessel. The vessel can contain a look box at the bottom of the vessel so that the aqueous layer-organic interface developed in the reaction mixture can be observed.

As indicated hereinbefore, the dihydronaphthalene product can be used in the preparation of alfin rubbers employing an alfin catalyst. The alfin catalyst can comprise a sodium alkoxide, a sodium alkenyl compound and an alkali metal salt, such as, for example, a mixture of sodium isoproproxide, allyl sodium, and sodium chloride. The catalyst is usually prepared by reacting amyl chloride with sodium, and subsequently reacting this product with a methyl n-alkyl carbinol and an olefin. In an illustrative example, the alfin catalyst is prepared by reacting two moles of amyl chloride and four equivalents of sodium in pentane or hexane, with high speed stirring. One mole of the resulting amyl sodium is then reacted with one mole of isopropyl alcohol, and one mole of the amyl sodium is reacted with one mole of propylene to give a mixture containing sodium isopropoxide, allyl sodium, and sodium chloride. These steps are effected at about —15° C. in order to prevent side reactions.

Typical preparations of an alfin catalyst for use in the alfin rubber process employing amyl chloride are described in sufficient detail in the Greenberg etal. Pats Nos. 3,067,187 and 3,223,691 and in the Morton articles supra, so that full details are not required here.

An alfin catalyst of satisfactory activity can also be obtained by inverting the order of reaction of the components. Such a process is described in U.S. Pat. No. 3,317,437, dated May 2, 1967, to Hoffman et al., and substituting n-butyl chloride for n-amyl chloride. In this method, isopropoxide is formed by direct reaction with sodium, instead of with alkyl sodium, with a saving one half of the alkyl halide and one quarter of the sodium. Such a catalyst can be prepared at ambient temperatures, up to and including the boiling point of the hydrocarbon solvent.

As the alcohol component, used to form the sodium alkoxide in the alfin catalyst, any methyl n-alkyl carbinol having from one to about ten carbon atoms can be used, such as isopropanol, methanol, methyl-n-propyl carbinol, and methyl n-butyl carbinol. Isopropanol is preferred.

The alkoxide will form at rather low temperatures, as low as —20° C. being satisfatcory. There is no upper limit on reaction temperature.

The olefin has from about three to about ten carbon atoms, and should contain the group —CH=CH—CH$_3$—. Propylene is preferred, giving allyl sodium, but butene-1, butene-2, pentene-1, and hexene-1 can also be used. Terminal olefins CH$_3$=CH—CH$_2$— are preferred. Activity may decrease as the olefin molecular weight increases.

The alkenyl sodium and sodium alkoxide composing the alfin catalyst are prepared by reaction of a sodium dispersion with the alcohol and the olefin in the presence of the dispersing liquid used for the catalyst. This can be and preferably is the same as the inert diluent used for the sodium dispersion in preparing the alfin catalyst and the dihydronaphthalene molecular weight modifier. Frequently, however, a lower-boiling hydrocarbon such as hexane is used, to facilitate separation later. Any inert aliphatic or cycloaliphatic hydrocarbon is satisfactory.

The olefin is metallated by use of an alkyl sodium, the organic portion having from about three to about ten carbon atoms. Butyl chloride is preferred, but amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about —20° to about +80° C. can be employed. From one to about five hours' reaction time is normally adequate.

The reaction mixture can be prepared by mixing the catalyst diluent, sodium dispersion, including aluminum distearate, if desired, and alkyl halide, and then adding the alcohol. After the alkoxide has been formed, the olefin is added, and metallated. Excess olefin is removed, and the residue can be used as the alfin catalyst, without further treatment or purification. In this method, the sodium is first converted to the alkyl sodium, and half this is then converted to the alkoxide, while the remainder is converted to alkenyl sodium.

It is also possible to add the alcohol to the sodium dispersion mixed with the catalyst diluent, forming the sodium alkoxide, and then adding the alkyl halide, and, finally, the olefin. This procedure requires half the amount of alkyl halide, and three-quarters the amount of sodium, required by the first procedure, and is therefore preferred in a commercial operation.

Such alfin catalysts can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1, 3-butadiene, aryl olefins, such as styrene, the various alkyl styrenes, p-methoxy styrene, alpha-methylstyrene, vinyl naphthalene, and other unsaturated hydrocarbons. 1,3-butadiene alone and combinations of butadiene and styrene or isoprene are preferred polymerizable unsaturated compounds, and the polymerization of these is particularly enhanced by the aluminum distearate-containing alfin catalysts prepared in accordance with this invention.

The amount of alfin catalyst (solid basis) that is employed for the alfin polymerization is normally from about 1 to about 5 weight percent and preferably from about 1 to about 3.5 weight percent, based on the weight of the unsaturated organic compound.

The alfin polymerization reaction generally takes place at atmospheric pressure and room temperature in a suitable reaction medium. The pressure and temperature conditions are not critical, however, and the reaction will take place at any pressure within the range from about 1 to about 50 atmospheres and at any temperature within the range from about —25 to about +100° C.

Preferred reaction media are inert aliphatic and cycloaliphatic hydrocarbons, such as pentane, hexane, 1:1 mixture of hexane and pentane, octane, cyclohexane, cyclopentane, cycloheptane, Decalin, and heptane. A preferred reaction solvent is the hydrocarbon employed for the dispersion of sodium in the preparation of the alfin catalyst and the dihydronaphthalene molecular weight modifier.

Where the same solvent or diluent is employed in the dispersion of sodium used in the preparation of the dihydro aromatic compound, in the dispersion of sodium used in the preparation of the alfin catalyst, and as the reaction medium in the preparation of alfin polymers, a continuous operation is facilitated since it is unnecessary to separate solvent mixtures, and the solvent or diluent separated from the alfin polymer can be recycled for reuse in any or all of the above-mentioned preparations.

It is quite important that water be excluded from the alfin polymerization reaction mixture, and consequently it is essential that all components that eventually will be employed therein, including the solvent employed in the dispersion of the sodium, be anhydrous.

The polymerization reaction can be conducted in a batch-wise, semi-continuous, or continuous manner, and the polymers and copolymers obtained as reaction products can be recovered by any conventional technique.

The following examples in the opinion of the inventors represent preferred embodiments of their invention.

EXAMPLE 1

1,4-dihydronaphthalene was prepared in accordance with the process of the instant invention employing a dispersion of sodium in an odorless mineral spirits as follows. 200 lb. of refined naphthalene was dissolved in 1000 lb. of dried commercial hexane in a 500 gallon 316 as Pfaudler reactor equipped with a temperature control jacket and a 3 HP 90 r.p.m. anchor type agitator, and provided with a nitrogen purge, and a port for the addition of sodium dispersion as well as rotameters for charging isopropanol and water. A 25% sodium dispersion in odorless mineral spirits, boiling range 349–406° F., containing 76.8 lb. sodium, having an average particle size of about 6 microns and representing a sodium excess of about 7% based on the amount of naphthalene in the mixture, was added to the naphthalene-hexane mixture.

298 lb. of isopropanol, representing about a 58.5% excess based on the amount of naphthalene in the mixture, was added to the mixture over a period of about five hours during which time the maximum temperature of the mixture was about 145° F. The reaction mass was stirred overnight (about 16 hours) before quenching and washing.

About 800 lb. of water was mixed with the reaction mass for about 15 minutes, while maintaining a temperature of 100° F., and the resulting mixture was allowed to settle for about 15 minutes. An aqueous layer thereby formed which contained the bulk of the sodium hydroxide. The aqueous layer was separated from the remainder of the reaction mass and found to weight about 829 lb. A small emulsion layer (47 lb.) was also recovered which when allowed to settle was found to be principally an aqueous phase.

The remainder of the reaction mass was then washed with about 600 lb. of water by stirring the water and the reaction mass for about 15 minutes at a temperature of 98° F., and allowing the mixture to settle for about 15 minutes. The aqueous layer weighing about 802 lb. was recovered from the remainder of the reaction mass.

The reaction mass was then washed with 600 lb. of water by stirring the water and reaction mass for about 15 minutes at a temperature of 96° F. The mixture was allowed to settle for about 15 minutes. The aqueous layer weighing 698 lb. was recovered from the remainder of the reaction mass.

Thereafter, the reaction mass was distilled to remove some 700 lb. hexane containing small amounts of water and isopropanol. The product was then transferred to stainless steel drums.

Samples of the final product were analyzed for Tetralin (1,2,3,4-tetrahydronaphthalene), 1,2-dihydronaphthalene, 1,4-dihydronapthalene and naphthalene. The naphthalene conversion to 1,4-dihydronapthalene was found to be about 88% and the conversion to 1,2-dihydronaphthalene was found to be about 12.3% or a weight ratio of the 1,4-isomer to the 1,2-isomer of about 7.13:1. The naphthalene accountability (i.e. the amount of naphthalene in the reaction products as a percentage of that used as a starting material) was found to be about 100%. The final product contained no sodium residue and was fit as is for use as a molecular weight modifier in the alfin rubber process.

EXAMPLES 2 AND 3

1,4-dihydronaphthalene was prepared in accordance with the process of the instant invention as follows employing a reactor as used in the Example 1 having a capacity of 100 gallons. Refind naphthalene was dissolved in dried commercial hexane to provide a weight ratio of hexane:napthalene of 4.3:1 in Example 2 and 5.0:1 in Example 3. A 25% sodium dispersion in Isopar E containing sodium having an average particle size of about 6 microns was added to the naphthalene-hexane mixture. Isopar E, a material devoid of n-hydrocarbons, has the following composition:

| Component: | Weight percent |
|---|---|
| 2,2,4-trimethylpentane | 2.2 |
| 2,5-dimethylhexane | } 4.8 |
| 2,4-dimethylhexane | |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane | |
| 3,4-dmethylheptane | |
| 2,3-dimethylheptane | } 5.7 |
| 3,3,4-trimethylhexane | |
| 15 other iso-components | 13.7 |
| $C_9$ naptha + $C_{10+}$ | 1.8 |
| | 100.0 |

Isopropanol was added to the mixture over a period of from about three to about five hours during which time the maximum temperature of the mixture was about 145° F. to 155° F. In Example 2 where the hexane:naphthalene ratio was 4.3:1, during the isopropanol addition, the mixture became quite thick. However, it was possible to maintain reasonably good agitation. The reaction mass was stirred overnight (about 16 hours) before quenching and washing.

In a first water wash or quench, water was mixed with the reaction mass, and the resulting mixture was allowed to settle. An aqueous layer thereby formed which contained the bulk of the sodium hydroxide. The aqueous layer was separated from the remainder of the reaction mass.

The remainder of the reaction mass was then washed with water by stirring the water and the reaction mass and allowing the mixture to settle. The aqueous layer was recovered from the remainder of the reaction mass.

The reaction mass was then washed with more water by stirring the water and reaction mass and the mixture was allowed to settle. The aqueous layer was recovered from the remainder of the reaction mass.

Thereafter, the reaction mass was distilled to remove water and isopropanol from the product. The product was then transferred to stainless steel drums.

Table I below sets out pertinent data for Examples 2 and 3 including pounds of hexane solvents, napthalene, sodium and isopropanol, percent of sodium theoretically required, percent of isopropanol theoretically required, reaction temperatures and washing conditions including pounds of water added, stirring time, settling time and pounds of aqueous layer decanted.

TABLE I

| Example number | 2 | 3 |
|---|---|---|
| Hexane solvent, lbs | 217 | 250 |
| Naphthalene charge, lbs | 50 | 50 |
| Hexane-naphthalene ratio | 4.3:1 | 5.0:1 |
| Sodium charge, lb.[1] | 19.20 | 19.20 |
| Percent of theoretical [2] | 107 | 107 |
| Isopropanol charge, lbs | 74.5 | 74.5 |
| Percent of theoretical [2] | 158.5 | 158.5 |
| Addition time, hrs | 4.0 | 4.5 |
| Reaction temperature: | | |
| Initial, °F | 86 | 90 |
| Maximum, °F | 160 | 160 |
| First water wash: | | |
| Water added, lbs | 200 | 200 |
| Temperature, °F | 75 | 89 |
| Stirring time, hrs | 0.2 | 0.1 |
| Settling time, hrs | 1.5 | 0.1 |
| Aqueous layer decanted, lbs | 188 | 204 |
| Second water wash: | | |
| Water added, lbs | 155 | 150 |
| Stirring time, hrs | 0.2 | 0.1 |
| Settling time, hrs | 0.6 | 0.1 |
| Aqueous layer decanted, lbs | 216 | 206 |
| Third water wash: | | |
| Water added, lbs | 150 | 150 |
| Stirring time, hrs | 17 | 0.1 |
| Settling time, hrs | 7 | 0.1 |
| Aqueous layer decanted, lbs | 170 | 174 |

[1] Sodium charged as 25.6% dispersion in Isopar E.
[2] Based on naphthalene.

Samples of the final products in both Examples 2 and 3 were analyzed for Tetralin (1,2,3,4-tetrahydronaphthalene), 1,2 - dihydronaphthalene, 1,4 - dihydronaphthalene and naphthalene, and the results are set out in Table II below.

TABLE II

| Example number | 2 | 3 |
|---|---|---|
| Naphthalene conversion, percent: | | |
| (a) to 1,4-dihydronaphthalene | 73.6 | 67.3 |
| (b) to 1,2-dihydronaphthalene | 18.4 | 20.8 |
| Weight ratio 1,4 isomer:1,2 isomer | 4.0:1 | 3.2:1 |
| Naphthalene accountability, percent | 9.30 | 94.0 |
| Weight of total products, lbs | 164 | 127 |

The final products in both Examples 2 and 3 had substantially no sodium residue and were fit as is for use as molecular weight modifiers in the alfin rubber process.

EXAMPLE 4

The solvent-containing dihydronaphthalene reaction product of Example 1 was employed in the preparation of an alfin polymer.

The alfin catalyst used in the polymerization was prepared as follows:

Odorless mineral spirits, boiling range 349–406° F., (465 parts) was charged to a 3-necked flask provided with a stirrer, inert gas sweep, and Dry Ice reflux condenser system. To this was added 13.8 parts of finely-divided sodium (0.6 gm. atom, average particles size of about 1 to 2 microns) dispersed in odorless mineral spirits. To the stirred slurry of sodium particles there was added dropwise 12.1 parts (0.2 mole) of dry isopropanol over a period of 15 minutes during which time the temperature rose to about 40° C. After stirring for one hour 18.9 parts (0.2 mole) of 2-butyl chloride was added over a period of one hour during which time the temperature rose to about 50° C. Stirirng was then maintained for an additional hour. Excess dry propylene (C.P. grade) was subsequently introduced into the mixture, the temperature of which was permitted to fall to 20° C. by means of an active reflux of liquefied propylene. The preparation was permitted to stand for eight hours with a propylene reflux before venting to remove excess propylene. The reactive slurry was transferred to a storage vessel and maintained under an atmosphere of inert gas. This alfin catalyst preparation (800 ml.,) contains equimolar quantities of sodium isopropoxide, sodium chloride and sodium allyl. The preparation contains the equivalent of 0.00075 mole of total sodium compounds per milliliter or 0.00025 mole of the active sodium allyl.

To 150 parts of dry odorless mineral spirits was added 1.0 parts of 1,4-dihydronaphthalene dissolved in 20 parts odorless mineral spirits prepared in accordance with the procedure of Example 1. Dry butadiene was then dissolved in the odorless mineral spirits at about −10° C. Alfin catalyst prepared as described above was added to the butadiene odorless mineral spirits solution. The system was sealed and maintained at room temperature with intermittent shaking for about two hours. The system was then opened, and ethanol was added to destroy the catalyst and to precipitate the product. The odorless mineral spirits was separated from the product by steam distilling at about 60° C., purified and recycled for reuse.

The product was then washed intermittently with ethanol and water containing antioxidant to remove soluble inorganic residues (such as sodium isopropoxide and sodium chloride). The resulting insoluble material was wet, white solid polybutadiene. It was given a final wash with acetone containing an antioxidant, N-phenyl-2-naphthylamine, and then dried in an oven at 40° C. under vacuum.

Having regard to the foregoing disclosure, the following is claimed as the inventive and patentable embodiments thereof:

1. A process for the preparation of alfin polymers while controlling molecular weight, which comprises hydrogenating an aromatic hydrocarbon having a naphthalene nucleus using a dispersion in an inert diluent of metallic sodium having an average particle size within the range from about 0.5 to about 50 microns and an aliphatic alcohol as the source of hydrogen, separating unreacted alcohol and metallic sodium and recovering a crude reaction product comprising diluent and a dihydronophthalene, incorporating such reaction product as alfin polymer molecular weight moderator in an alfin polymer reaction mixture comprising an unsaturated organic compound, an alfin catalyst and the same diluent and polymerizing the reaction mixture to form an alfin polymer, separating the diluent from the alfin polymer product, and recycling the diluent for reuse.

2. A process in accordance with claim 1, in which the inert diluent is a saturated aliphatic hydrocarbon.

3. A process in accordance with claim 1 in which the aromatic hydrocarbon is naphthalene.

4. A process in accordance with claim 1 wherein the hydrogenation of the aromatic hydrocarbon is carried out at a temperature within the range from about 75 to about 200° F.

5. A process in accordance with claim 1 wherein the polymerization of the unsaturated organic compound is carried out at a temperature within the range from about −25 to about +100° C. and at a pressure within the range from about 1 to about 50 atmospheres.

References Cited
UNITED STATES PATENTS 3,491,074  1/1970  Grinninger _____ 260—82.1
3,513,211  5/1970  Grinninger _____ 260—667

JOSEPH L. SCHOFER, Primary Examiner
W. F. HAMROCK, Assistant Examiner

U.S. Cl. X.R.
260—93.5 R, 94.2 M